United States Patent
Matsuhashi

[19]

[11] Patent Number: 6,060,855
[45] Date of Patent: May 9, 2000

[54] MOVING APPARATUS FOR ARM OF TOOL EDGE SENSOR

[75] Inventor: Akira Matsuhashi, Tokyo, Japan

[73] Assignee: Metrol Co., Ltd., Tokyo, Japan

[21] Appl. No.: 09/240,583

[22] Filed: Feb. 1, 1999

[30] Foreign Application Priority Data

Feb. 5, 1998 [JP] Japan ................................. 10-061861

[51] Int. Cl.⁷ ................................................ B23Q 17/22
[52] U.S. Cl. .......................... 318/652; 318/560; 82/152
[58] Field of Search .............................. 318/560, 568.16, 318/638, 652; 74/813 R, 469, 504, 519, 527; 82/152; 408/116, 186

[56] References Cited

U.S. PATENT DOCUMENTS

| | | | |
|---|---|---|---|
| 4,374,309 | 2/1983 | Walton | 200/61.42 |
| 5,526,725 | 6/1996 | Tremaglio et al. | 82/1.11 |
| 5,537,372 | 7/1996 | Albrecht et al. | 369/43 |
| 5,600,973 | 2/1997 | Drisaldi | 66/9 A |

FOREIGN PATENT DOCUMENTS 62-32071  7/1987  Japan.

*Primary Examiner*—Bentsu Ro
*Attorney, Agent, or Firm*—Kanesaka & Takeuchi

[57] ABSTRACT

In a moving apparatus of an arm for a tool edge sensor, the arm can be moved between a housing position which does not obstruct a processing work and a detecting position projected from the housing position. The apparatus is provided with a detecting sensor at a forward end of the arm, a moving device for moving the arm between the housing position and the detecting position, end a positioning device formed of at least six-point contacts arranged separately for three-dimensionally restricting the arm at the detecting position. When the arm is moved between the housing position and a position right before the detecting position, it is moved by the moving device, and at the detecting position of the arm, the arm is released from the moving device and positioned only by the positioning device. Since a positioning error due to the moving device at the time of positioning the detecting position does not occur, the arm can be positioned extremely accurately.

10 Claims, 18 Drawing Sheets

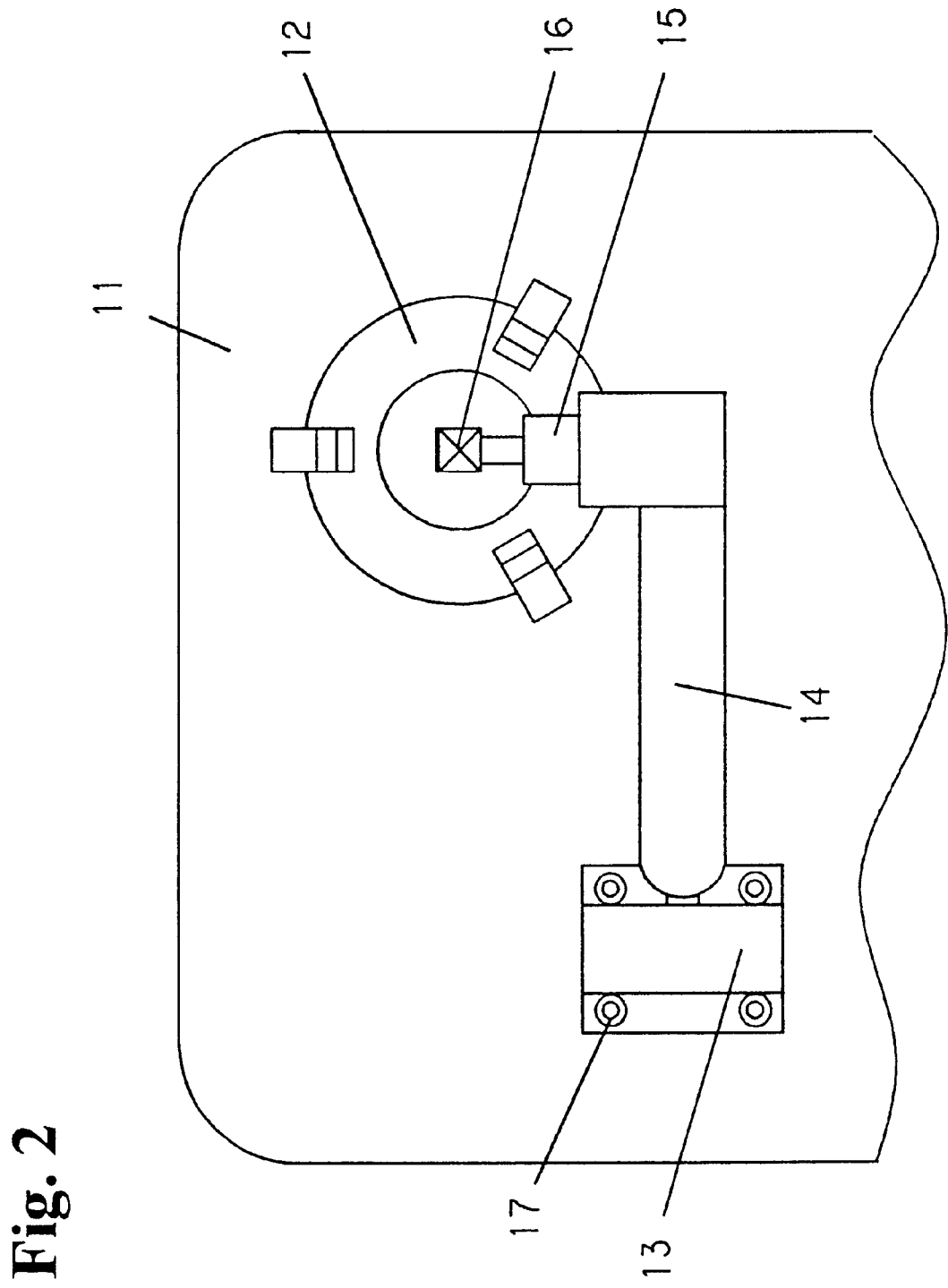

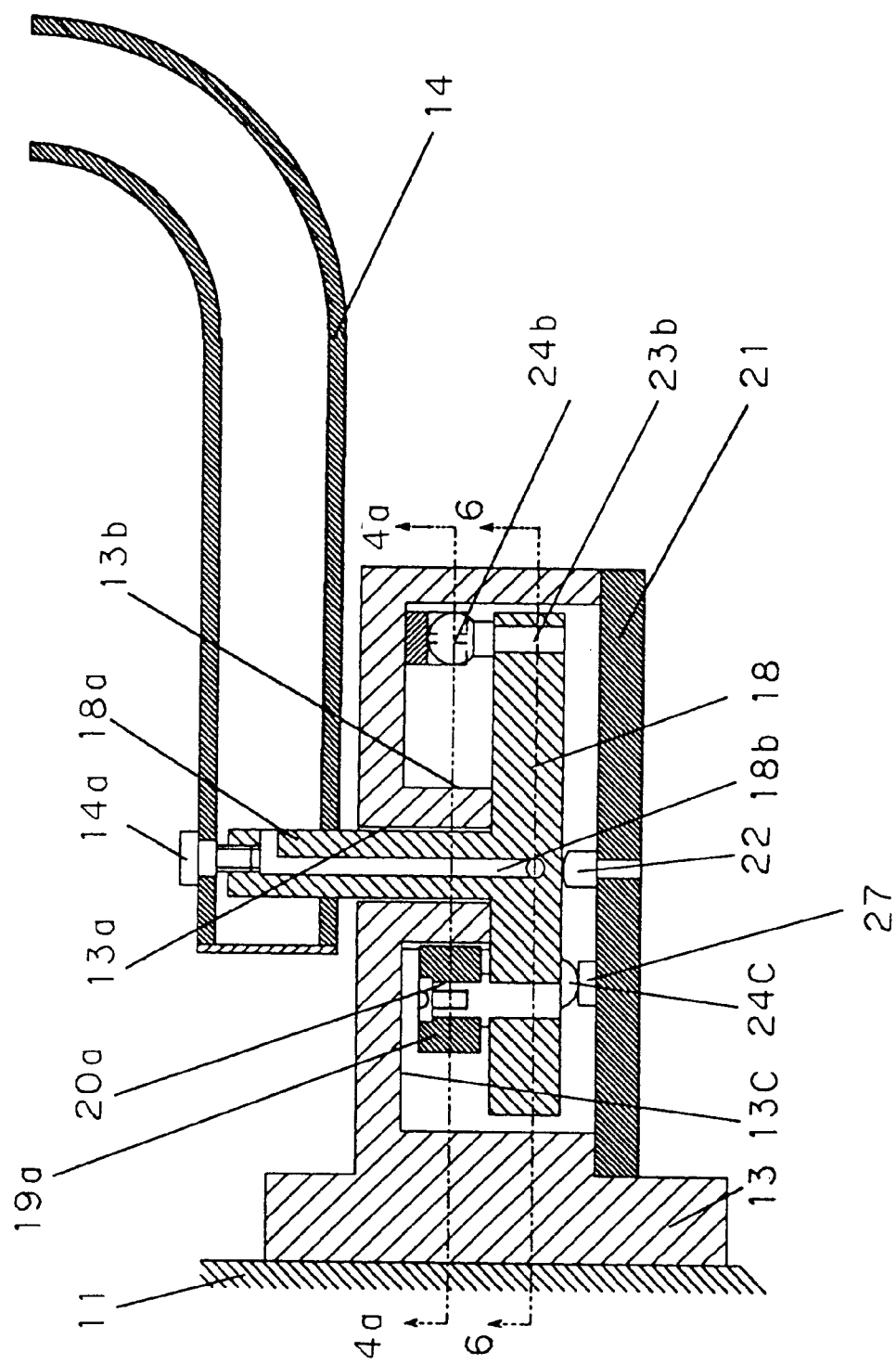

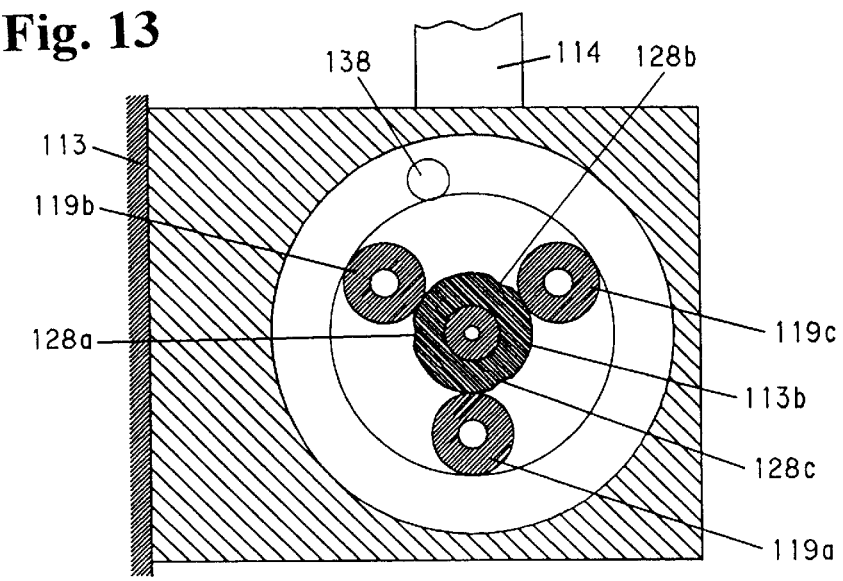
Fig. 13
Fig. 14b
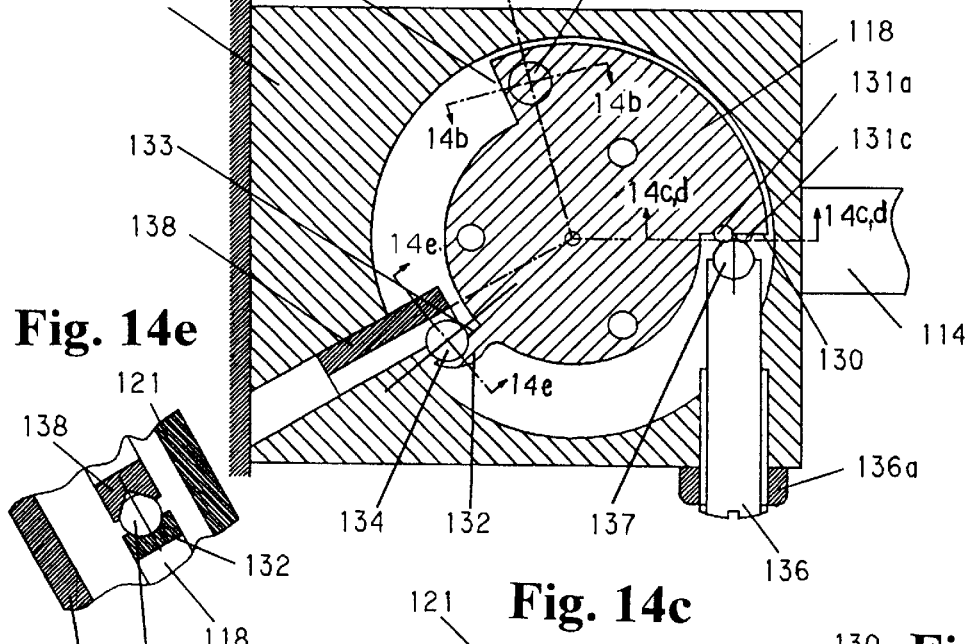
Fig. 14a
Fig. 14e
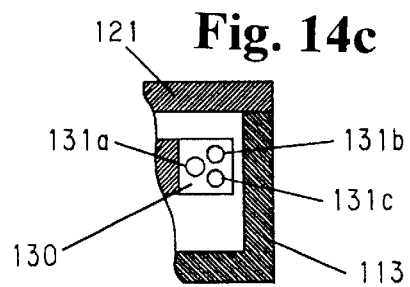
Fig. 14c
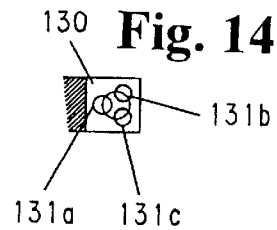
Fig. 14d

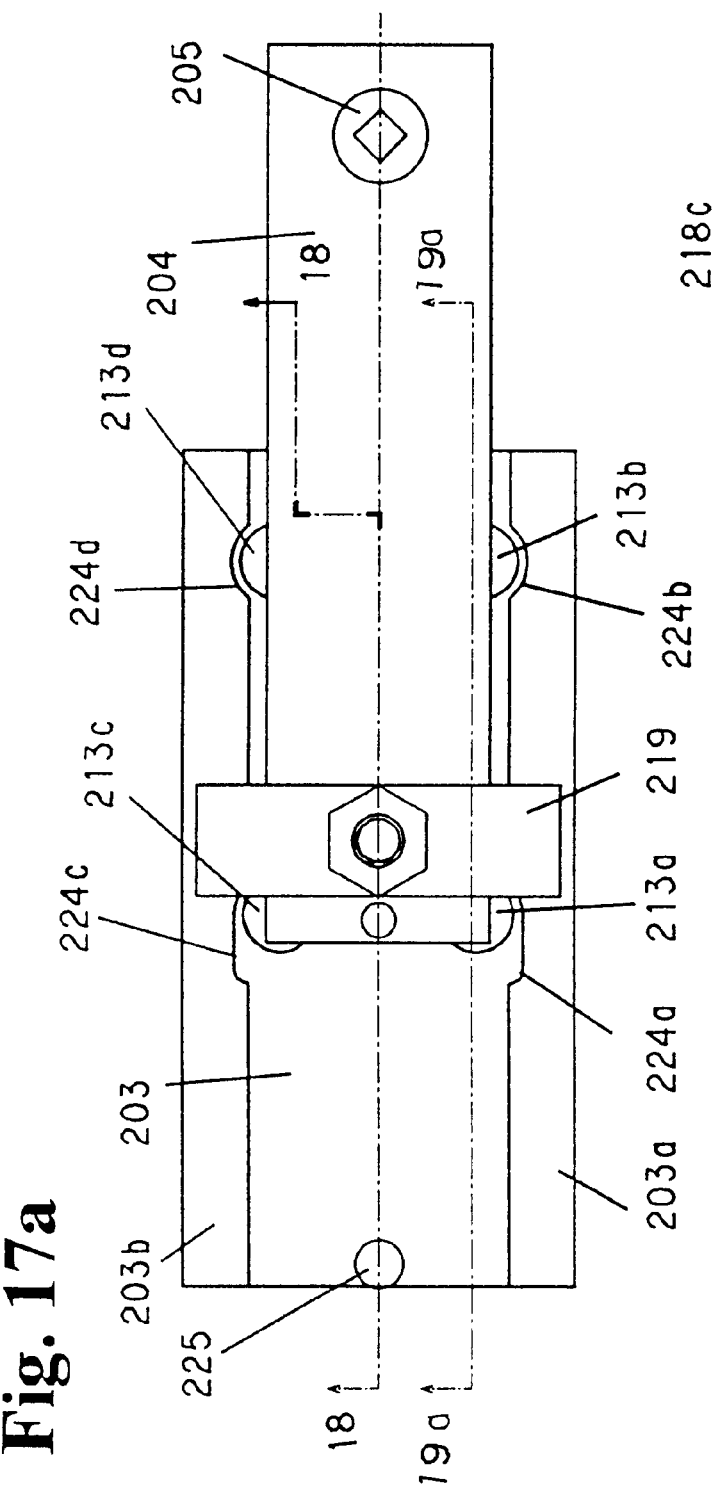
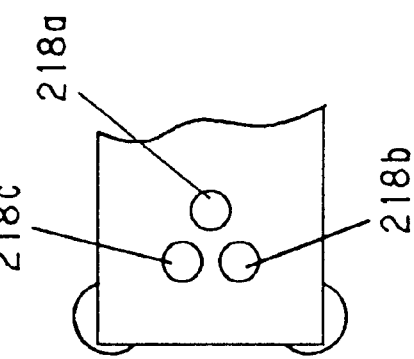
Fig. 17a
Fig. 17b

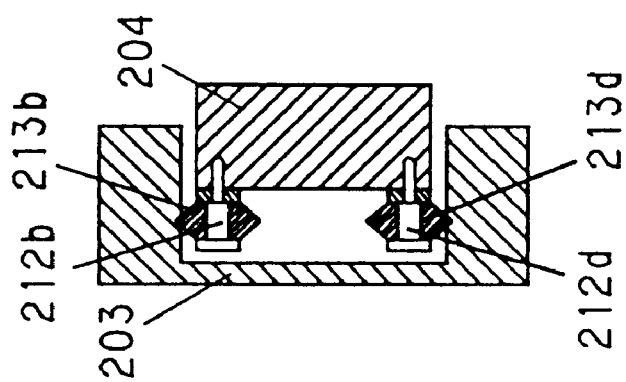
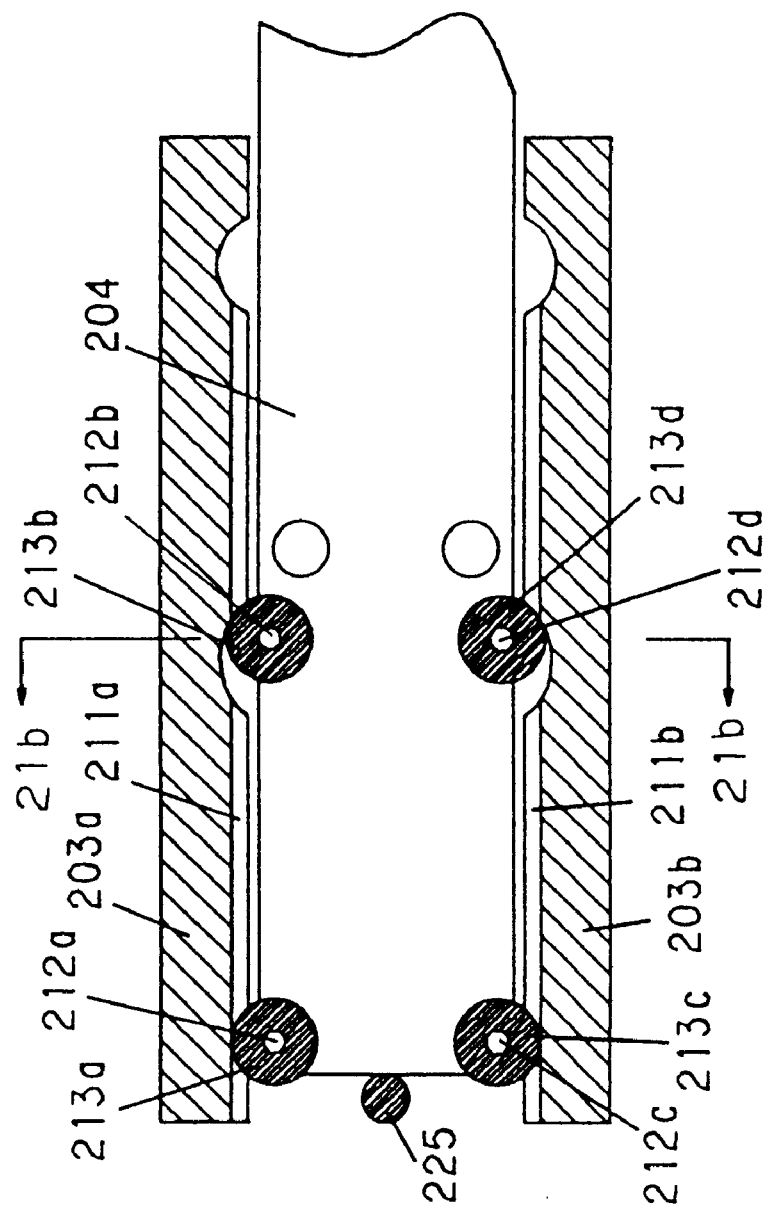

MOVING APPARATUS FOR ARM OF TOOL EDGE SENSOR

BACKGROUND OF THE INVENTION AND RELATED ART STATEMENT

The present invention relates to a moving apparatus for a detecting arm with a detecting sensor at a forward end thereof, which is movable between a housing position disposed at a position where a processing work is not obstructed and a detecting position projecting from the housing position.

Heretofore, in a moving apparatus wherein a rotating portion is provided at a base end, for example, as disclosed in Japanese Patent Publication (KOKOKU) Sho 62-32071, a rotating shaft 4 of a detecting arm 8 with a detecting device main frame 9 at a forward end thereof is mounted on bearings 5, 6 of a headstock 1 so that the detecting arm 8 can be rotated. The detecting arm 8 is stopped by abutting against a lower limit stopper 18 at a rotation lower limit detecting position where a tool edge of a cutting tool set on a tool rest T abuts against a detecting head 12 or the like of the detecting device 9.

Although the lower limit detecting position of the detecting device 9 at the forward end of the detecting arm 8 is determined by the rotating shaft 4 and the lower limit stopper 18, due to the influence of a clearance of a bearing between the rotating shaft 4 and the bearings 5, 6, there has been a problem such that positioning accuracy of the lower limit detecting position of the detecting device 9 becomes bad.

The present invention has been made in view of the above defect, and an object of the invention is to provide a moving apparatus of an arm for a tool edge sensor, wherein a positioning error due to the moving apparatus at the time of positioning the arm at a detecting position is not created.

Another object of the invention is to provide a moving apparatus of an arm for a tool edge sensor as stated above, wherein the positioning accuracy, especially, iterative positioning accuracy is extremely high.

Further objects and advantages of the invention will be apparent from the following description of the invention.

SUMMARY OF THE INVENTION

In order to attain the above objects, in a moving apparatus of an arm (hereinafter referred to as detecting arm) for a tool edge sensor of the present invention, the detecting arm can be moved between a housing position which does not obstruct processing work and a detecting position projected from the housing position. The moving apparatus is provided with the detecting arm with a detecting sensor or tool edge sensor at a forward end thereof; a moving device for moving the detecting arm between the housing position and the detecting position; and a positioning device formed of at least six-point contacts for three-dimensionally restricting the detecting arm at the detecting position, the contacts being separately provided. When the detecting arm is moved between the housing position and a position right before the detecting position, the detecting arm is moved by the moving device, and at the detecting position of the detecting arm, the detecting arm is released from restriction of the moving device and positioned at the detecting position only by the positioning device.

The moving device may be a rotating device provided at a base portion of the detecting arm to rotate the detecting arm. The moving device may be structured such that the detecting arm guided by a base guide slides linearly.

Also, the positioning device including the six-point contacts may be arranged on both sides of a rotating plate provided at a base portion of the detecting arm. In this case, a contacting pressure is provided by an eccentric load of the detecting arm produced at the base portion of the detecting arm.

Further, the positioning device including the six-point contacts may be disposed on one side of the rotating plate provided to the base portion of the detecting arm, and a contacting pressure thereof is provided by a pressing force.

Still further, the positioning device including the six-point contacts may be provided between the base guide and the detecting arm, and the contacting pressure thereof is provided by a load of the detecting arm produced at the base portion of the detecting arm.

Also, the positioning device includes a steel ball contacting three steel balls at three points in total.

BRIEF DESCRIPTION OF THE DRAWINGS

FIG. 2 is a front view of FIG. 1;

FIG. 3 is a partially enlarged sectional view of FIG. 1;

FIG. 4b is a partial sectional view taken along line 4b—4b in FIG. 4a, FIG. 4c is an explanatory sectional view of a portion 4c in FIG. 4a, and FIG. 4d is an explanatory sectional view of a portion 4d in FIG. 4a;

FIG. 5 is a view for showing a different state of FIG. 4a;

FIG. 9b is a partial sectional view taken along line 9b—9b in FIG. 9a;

FIG. 13 is a sectional view similar to FIG. 12 for showing another state;

FIG. 14a is a sectional view taken along line 14a—14a in FIG. 11, FIG. 14b is a sectional view taken along line 14b—14b in FIG. 14a, FIGS. 14c and 14d are sectional views taken along line 14c,d—14c,d in FIG. 14a, and FIG. 14e is a sectional view taken along line 14e—14e in FIG. 14a;

FIG. 15b is a side view of FIG. 15a, and FIG. 15c is a plan view for showing a state different from FIG. 15a;

FIG. 16a is a plan view for showing an embodiment different from that shown in FIG. 15a, and FIG. 16b is a front view of FIG. 16a;

FIG. 17a is a plan view, wherein an arm portion is taken out from FIG. 15a, and FIG. 17b is a partial plan view of FIG. 17a;

FIG. 18 is a sectional view taken along line 18—18 in FIG. 17a;

FIG. 19a is a sectional view taken along line 19a—19a in FIG. 17a, and FIG. 19b is a sectional view taken along line 19b—19b in FIG. 19a;

FIG. 20a is a sectional view taken along line 20a—20a in FIG. 19a, and FIG. 20b is a sectional view taken along line 20b—20b in FIG. 20a;

FIG. 21a is a sectional view similar to FIG. 19a for showing a state different from FIG. 20a, and FIG. 21b is a sectional view taken along line 21b—21b in FIG. 21a.

DETAILED DESCRIPTION OF PREFERRED EMBODIMENTS

Figure 1:
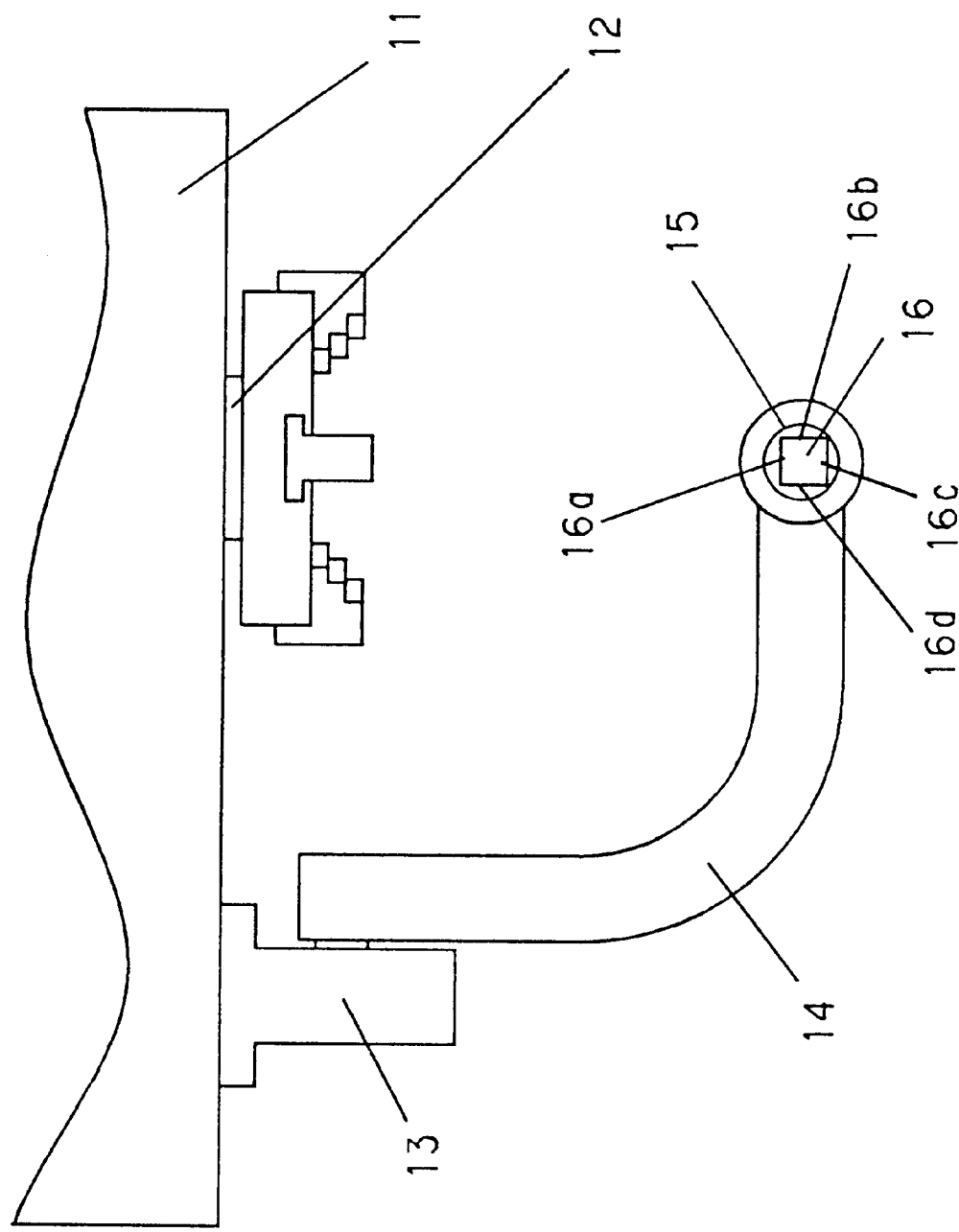
FIG. 1 is a plan view for showing a structure of a moving apparatus of an arm for a tool edge sensor of a first embodiment of the invention.

FIGS. 1 to 6 show a first embodiment of a moving apparatus of an arm (hereinafter referred to "detecting arm") for a tool edge sensor according to the invention, wherein FIG. 1 is a plan view for showing a structure of the apparatus, and FIG. 2 is a front view thereof. In the drawings, reference numeral 11 represents a main shaft portion, such as a lathe; 12 denotes a main shaft; 13 is a base portion of a detecting arm 14 attached to the main shaft portion; 15 is a tool edge sensor provided at a forward end of the detecting arm; 16 is a contact of the tool edge sensor 15, wherein respective contact surfaces 16a, 16b, 16c and 16d are positioned vertically relative to the main shaft 12. Reference numeral 17 denotes bolts for fastening the base portion 13 to the main shaft portion 11.

FIG. 3 is an enlarged sectional view in the vicinity of the base portion 13 taken along the center of the detecting arm 14 in the plan view in FIG. 1, which is shown as a view rotated by 90 degrees in the counterclockwise direction from the view shown in FIG. 1, for the convenient sake.

Figure 4B:
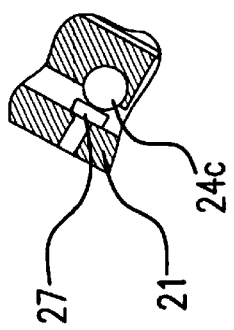
Figure 4D:
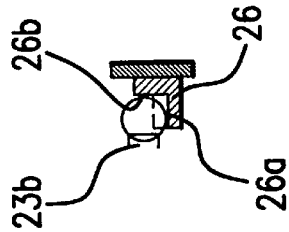
Figure 4C:
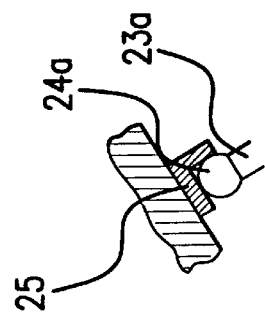
Figure 4A:
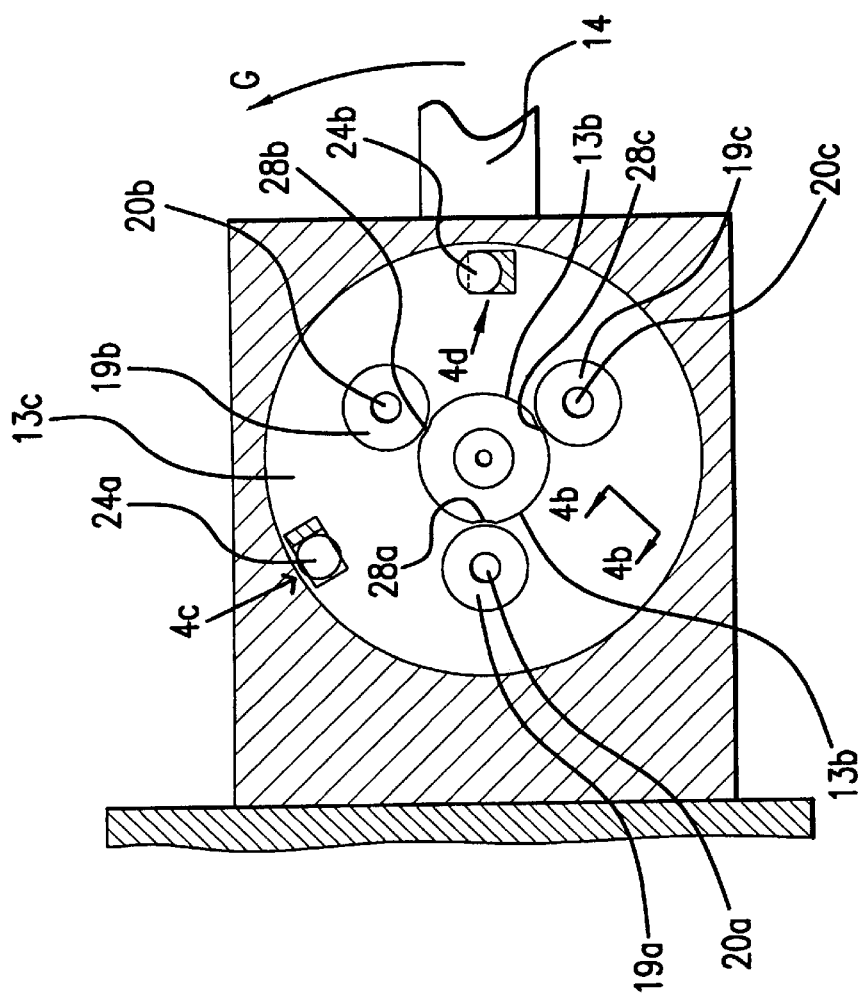
FIG. 4a is a sectional view taken along line 4a—4a in FIG. 3.

Also, FIG. 4a is a partially cut side view taken along line 4a—4a in FIG. 3, and FIG. 4b is a part of a sectional view taken along line 4b—4b in FIG. 4a.

In FIGS. 3 and 4a, a boss 18a of a rotating plate 18 penetrates a hole 13a of the base portion 13 to project from a surface of the base portion 13, so that a forward edge portion of the boss 18a is fixed to one end of the detecting arm 14 by a bolt 14a or the like. Incidentally, a small hole 18b is provided in the boss 18a for allowing a lead wire for a sensor to pass through from the base portion 13 to the tool edge sensor 15 at the forward end of the detecting arm 14.

In the rotating plate 18, roller bearings 19a, 19b, 19c positioned at approximately trisected positions relative to the center of the rotating plate 18 are rotatably mounted on rotating shafts 20a, 20b, 20c. Since the roller bearings 19a, 19b, 19c can be rotated while their outer circumferences contact an outer circumference of the shaft portion 13b of the base portion 13, the detecting arm 14 can be rotated with respect to the base portion 13 by the roller bearings 19a, 19b, 19c; a lower end surface of the shaft portion 13b in FIG. 3; an upper surface of the rotating plate 18 in FIG. 3; and a thrust bearing 22 disposed in a cover 21 integrally formed with the base portion 13. A space is formed between an outer circumference of the boss 18a and an inner surface of the hole 13a so that they do not contact each other.

The rotating plate 18 is provided with steel balls 24a, 24b, in the vicinity of the outer circumference thereof, which are fixed to bearing 23a, 23b, both having the same shape. The bearings 23a, 23b are fixed to the rotating plate 18 spaced approximately 120 degrees away from each other with respect to the center of the rotating plate 18 and with an approximately equal distance from the center.

In case the detecting arm 14 is located at a position shown in FIGS. 1 and 4(b), i.e. at the detecting position, the detecting arm 14 applies an eccentric load, i.e. turning moment, to the base portion 13. By utilizing the eccentric load, as shown in FIG. 4c which is partially side view, the steel ball 24a contacts an angle 25 provided at an inner surface 13c of the base portion 13 at two points, while the steel ball 24b contacts a V groove piece 26 provided at the inner surface 13c of the base portion 13 and having a V-groove 26a and a wall 26b vertical to the V groove at three points, as shown in FIG. 4d which is sectional view.

Figure 5:
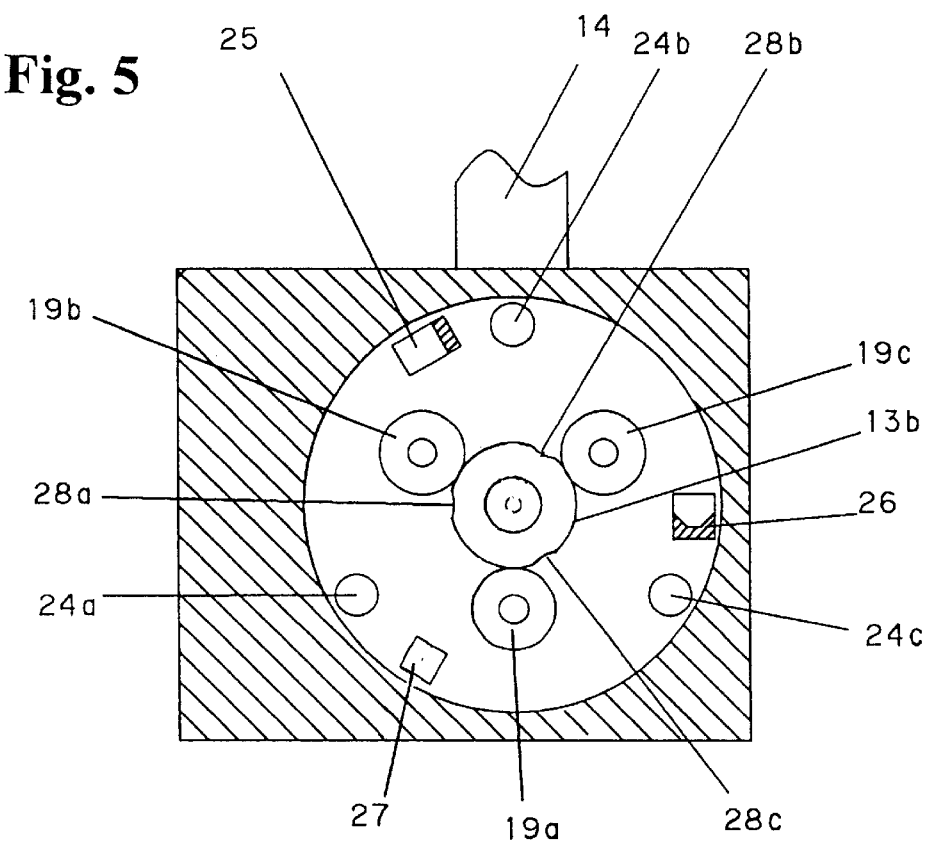

Further, in the rotating plate 18, a steel ball 24c is fixed at an intermediate position between the steel ball 24a and the steel ball 24b, i.e. away from both steel balls 24a and 24b by about 120 degrees relative to a central axis of the rotating plate 18, respectively, so that the steel ball 24c is fixed on the side opposite to the steel balls 24a and 24b (Refer to FIG. 4b, and with respect to a position of the ball 24a, refer to FIG. 5). When the detecting arm 14 is located at the position as shown in FIGS. 1 to 4a, i.e. at the detecting position, a forward edge of the steel ball 24c contacts a seat 27, at one point, provided at the cover 21 integrally formed with the base portion 13 with virtue of the eccentric load.

In case the detecting arm 14 is located at the position as shown in FIGS. 1 to 4a, i.e. at the detecting position, outer circumferences of the roller bearings 19a, 19b, 19c coincide with the escape portions 28a, 28b, 28c of the shaft portion 13b. Also, a thrust bearing portion including the lower edge surface of the shaft portion 13b in FIG. 3, the upper surface of the rotating plate 18 in FIG. 3, and the thrust bearing 22 disposed in the cover 21 is loosely set, i.e. with a play. In case the steel ball 24a contacts the angle 25, the steel ball 24b contacts the V groove piece 26, and the steel ball 24c contacts the seat 27, respectively, i.e. at six points in total. Also, the bearing device does not restrict the rotating plate 18 at all, and the detecting arm 14 is three-dimensionally restrained at the detecting position, i.e. in the X, Y, Z directions with respect to the base portion 13, through the six point contacts with the three steel balls.

In the first embodiment, since the eccentric load of the detecting arm 14 is used, the above six point contacts are divided on both sides of the rotating plate 18.

FIG. 5 shows a state wherein the detecting arm 14 is rotated manually, for example, by 90 degrees in an arrow G direction in FIG. 4a from a state shown in FIG. 4a, and a stopper is omitted. With the rotation of the detecting arm 14 in the G direction in FIG. 4a, the roller bearings 19a, 19b, 19c are moved from the escape portions 28a, 28b, 28c, and rotated on the shaft portion 13b. Thus, the detecting arm 14 is rotated by 90 degrees relative to the base portion 13 thereby to be located at a position as shown in FIG. 5. In other words, the tool edge sensor 15 is retreated from a working area for an object to be worked, which is attached to the main shaft 12 of the lathe, so that the tool edge sensor 15 is retreated at a position where work of the lathe or the like is not obstructed.

Figure 6:
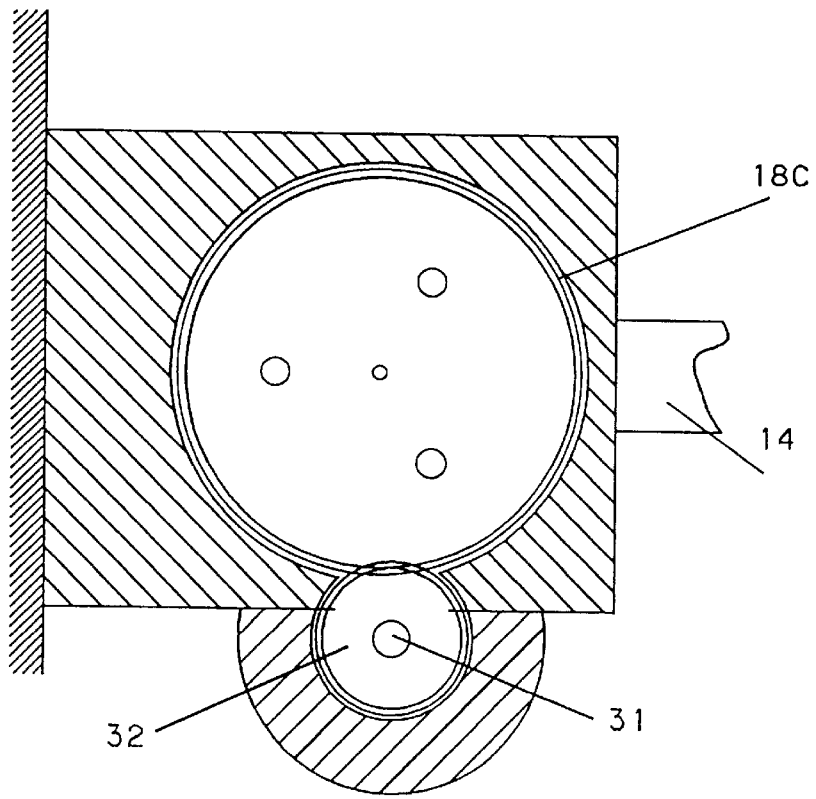
FIG. 6 is a sectional view taken along line 6—6 in FIG. 3.

FIG. 6 shows a sectional view taken along line 6—6 in FIG. 3. Since an outer circumference of the rotating plate 18 is provided with a gear 18c, when the gear 18c is rotated by a pinion 32 disposed on a shaft 31 of a motor, the detecting arm 14 can be rotated by an electric motor. Also, a rack may be used instead of the pinion 32.

As described hereinabove, the moving apparatus of the detecting arm for the tool edge sensor of the invention is structured such that the rotating device and the positioning device for the detecting arm 14 are separated; when the detecting arm 14 is rotated, the detecting arm 14 is rotated by the rotating device; and in the detecting position of the detecting arm 14, the detecting arm 14 is released from the restriction of the rotating device, and is positioned only by the positioning device.

Figure 7:
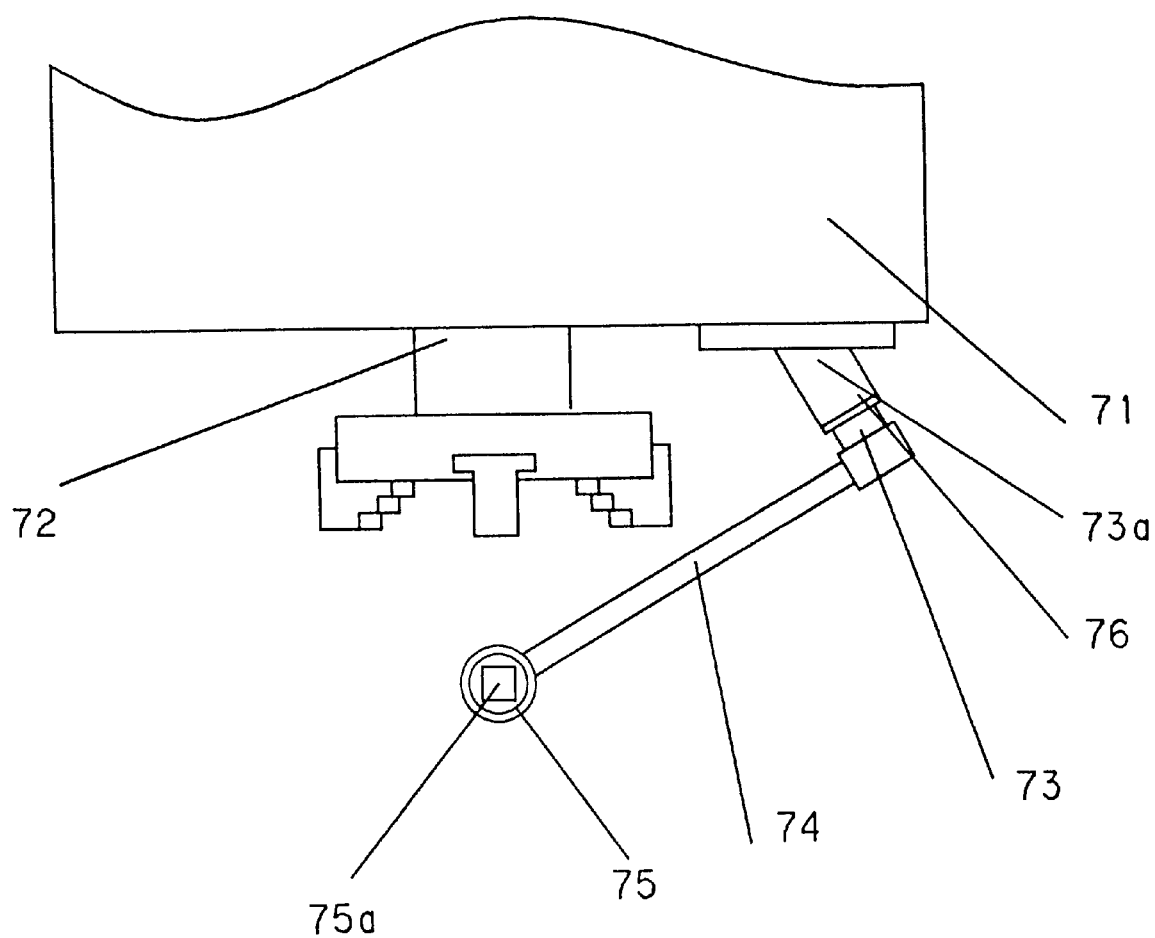
FIG. 7 is a plan view for showing a structure of a second embodiment of the invention.

FIGS. 7 to 9b show a second embodiment of a moving apparatus of a detecting arm for a tool edge sensor of the invention. FIG. 7 is a plan view for showing a structure of the invention, wherein reference numeral 71 denotes a main shaft portion, such as a lathe; 72 is a main shaft; and 73 is a base portion. The base portion 73, on a side of the main shaft portion 71, is attached to a cylindrical housing 76 fixed to the main shaft portion 71 by bolts or the like, and a forward edge on the opposite side thereof is provided with a detecting arm 74 to be rotated. The detecting arm 74 is provided with a tool edge sensor 75 at its forward edge, and four faces of a contact 75a of the tool edge sensor 75 are positioned to be vertical relative to the main shaft 72.

In FIG. 7, a measuring position of the tool edge sensor 75 is shown. In case the tool edge sensor 75 is not used, the tool edge sensor 75 is rotated, for example, by 90 degrees with respect to a center axis 73a of the base portion 73, in an upper direction on the sheet in FIG. 7, so that the tool edge sensor 75 is retreated from a moving area of an object to be worked which is attached to the main shaft 72 and a turret, not shown.

Figure 8:
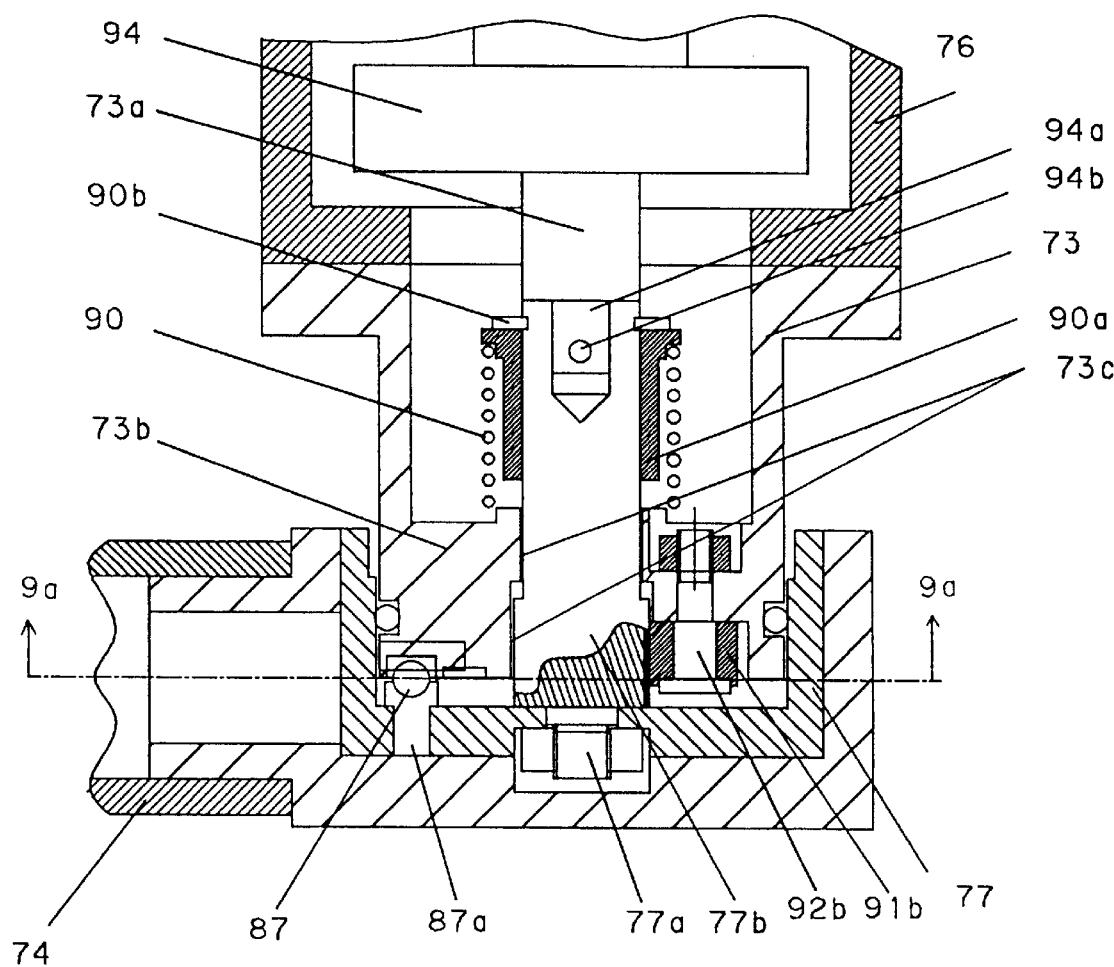
FIG. 8 is a partially enlarged sectional view of FIG. 7.

FIG. 8 is a partially enlarged sectional view taken along the center of the detecting arm 74 in the plan view in FIG. 7, wherein a central line 73a of the base portion 73 in FIG. 7 is shown as an ordinate in FIG. 8, and the central axis of the detecting arm 74 in FIG. 7 is shown as an abscissa in FIG. 8.

Figure 9A:
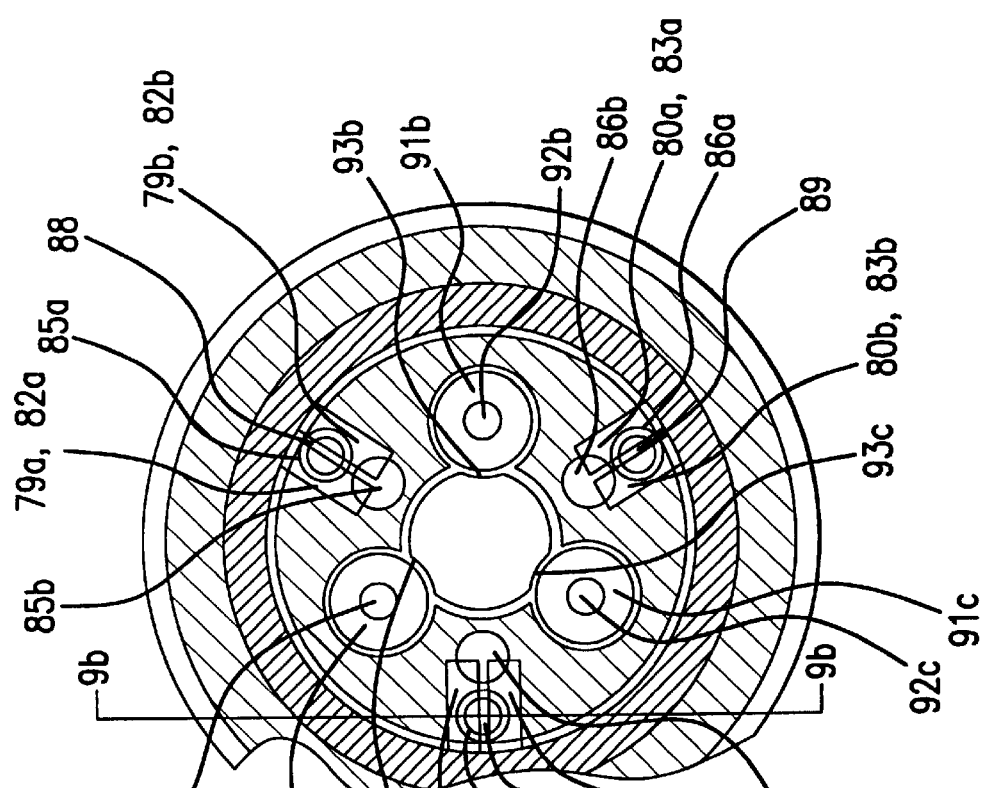
FIG. 9a is a sectional view taken along line 9a—9a in FIG. 8.
Figure 9B:
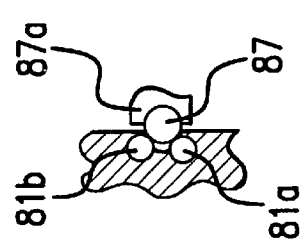

FIG. 9a is a sectional view taken along line 9a—9a in FIG. 8; and FIG. 9b is a part of a sectional view taken along line 9b—9b in FIG. 9a.

In FIGS. 8 and 9a, a hole 73c is provided at a center of the forward end portion 73b of the base portion 73, and a shaft 77b integrally fastened with a rotating plate 77 by a screw 77a is inserted into the hole 73c with a space therebetween.

In the forward end portion 73b of the base portion 73, two parallel holes 78a, 78b; 79a, 79b; 80a, 80b are radially provided at approximately regular intervals, i.e. with 120 degree intervals, so that center lines of the respective parallel holes are directed toward the center line 73a of the base portion 73, and are all located on vertical surfaces with respect to the center line 73a. Cylindrical pins 81a, 81b; 82a, 82b; 83a, 83b are inserted into the respective parallel holes without play therebetween.

Further, spot facing holes 84a, 84b; 85a, 85b; 86a, 86b are provided on a surface of the base portion 73, and the spot facing holes 84b, 85b, 86b are filled with a bonding agent so that. the respective cylindrical pins 81a, 81b; 82a, 82b; 83a, 83b are bonded to the respective parallel holes 78a, 78b; 79a, 79b; 80a, 80b. On the other hand, through the spot facing holes 84a, 85a, 86a, steel balls 87, 88, 89, described later, pass to thereby directly contact the respective cylindrical pins 81a, 81b; 82a, 82b; 83a, 83b.

Lower portions of the steel balls 87, 88, 89 are fixed to receiving shafts 87a, 88a, 89a (88a, 89a are not shown, but have the same shape as that of 87a), and the receiving shafts 87a, 88a, 89a are embedded into the rotating plate 77. Also, a shaft 77b, i.e. the rotating plate 77, is compressed in an upper direction by a compression coil spring 90 in a state as shown in FIG. 8. Therefore, upper portions of the steel balls 87, 88, 89 strongly contact the cylindrical pins 81a, 81b; 82a, 82b; 83a, 83b, respectively.

Since the rotating plate 77 and the detecting arm 74 are fastened by plural screws, six point contacts with the upper portions of the steel balls 87, 88, 89 and the cylindrical pins 81a, 81b; 82a, 82b; 83a, 83b allow the detecting arm 74 to be held at an extremely precise detecting position. Incidentally, reference numeral 90a designates a spring bearing ring, and 90b is an E ring for stopping movement of the spring bearing ring 90a.

Further, roller bearings 91a, 91b, 91c are rotatably mounted on rotating shafts 92a, 92b, 92c fixed to the forward end portion 73b of the base portion 73 at approximately trisected positions; and directed to the center of the shaft 77b, so that the roller bearings 91a, 91b, 91c can be rotated while slightly strongly contacting the outer circumference of the shaft 77b of the rotating plate 77. Thus, the rotating plate 77, i.e. detecting arm 74 can be rotated by the roller bearings 91a, 91b, 91c with respect to the base portion 73.

However, in the state as shown in FIGS. 7 to 9(b), i.e. in case the detecting arm 74 is located at the detecting position, since the outer circumferential positions of the roller bearings 91a, 91b, 91c coincide with escape portions 93a, 93b, 93c of the shaft 77b, while the upper portions of the steel balls 87, 88, 89 strongly contact the cylindrical pins 81a, 81b; 82a, 82b; 83a, 83b, respectively, the roller bearings 91a, 91b, 91c do not function as rotation bearings.

Accordingly, the above bearing device does not restrict the rotating plate 77 at all, and the six point contacts of the three steel balls cause the detecting arm 74 to be three-dimensionally restricted at the detecting position, i.e. in the X, Y, Z directions with respect to the central shaft with the line 73a.

In the second embodiment, since the contacting pressure by the six-point contacts is provided by the compression coil spring 90, the six-point contacts are located only on one side of the rotating plate 77.

In FIG. 8, on the side of the main shaft portion 71 of the shaft 77b (refer to FIG. 7), a swing cylinder 94 is fixed in a cylinder housing 76, and a movable shaft 94a at the forward end thereof is connected to the shaft 77b by a pin 94b. The movable shaft 94a of the swing cylinder 94 is pressed against the forward end side (lower portion in FIG. 8) of the base portion 73 or the shaft 77b, and then rotated.

More specifically, the movable shaft 94a of the swing cylinder 94 presses the shaft 77b against a compression force of the compression coil spring 90 to thereby separate the upper parts of the steel balls 87, 88, 89 from the cylindrical pins 81a, 81b; 82a, 82b; 83a, 83b, and then the movable shaft 94a is rotated, for example, by 90 degrees in the clockwise direction in FIG. 9a. Thus, the shaft 77b is guided by the roller bearings 91a, 91b, 91c and the detecting arm 74 is also rotated by 90 degrees, so that the tool edge sensor 75 can be retreated from the moving area of the object to be worked which is attached to the main shaft and a turret, not shown.

Figure 10:
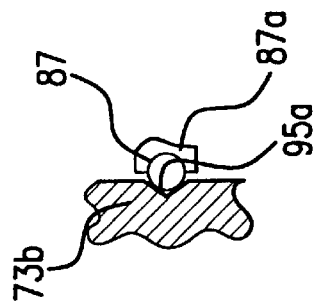
FIG. 10 is a view for showing another embodiment corresponding to FIG. 9b.

FIG. 10 is a view corresponding to FIG. 9b, wherein the structure of the second embodiment is partially modified. More specifically, a V groove 95a is provided instead of the cylindrical pins 81a, 81b in FIG. 9b. Though not shown in FIG. 10, the cylindrical pins 82a, 82b; 83a, 83b in FIG. 9a should be replaced by similar V grooves 95b, 95c, and their actions and functions are exactly the same as those in the second example, which are therefore omitted.

As described hereinabove, the rotating device and the positioning device of the detecting arm 74 are separated, and while the detecting arm 74 is rotated, it is rotated by the rotating device. When the detecting arm 74 is located at its detecting position, it is released from the rotating device and positioned only by the positioning device.

Figure 11:
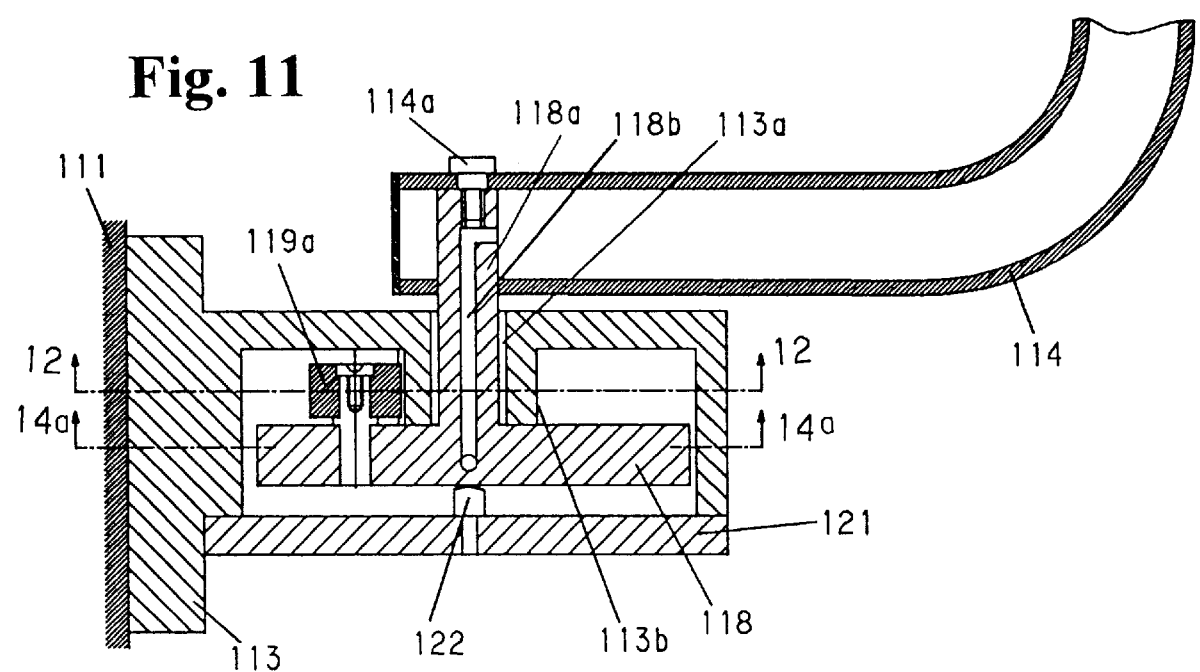
FIG. 11 is a partial sectional view for showing a structure of a third embodiment of the present invention.
Figure 12:
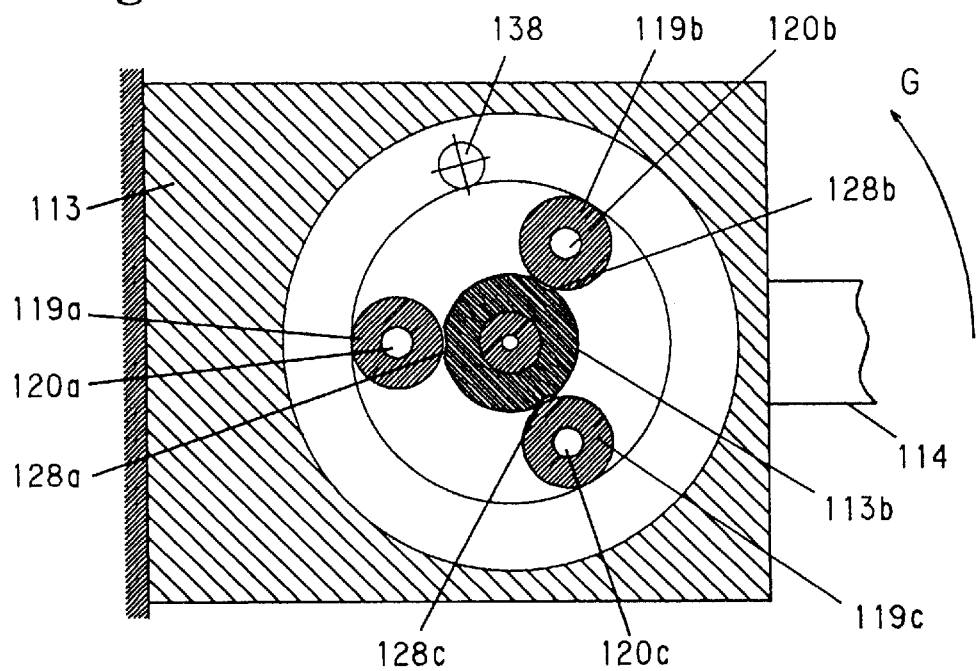
FIG. 12 is a sectional view taken along line 12—12 in FIG. 11.

FIGS. 11 to 14 show a third embodiment of a moving apparatus of a detecting arm for a tool edge sensor of the present invention, wherein an appearance of the device is the same as that shown in FIGS. 1 and 2, and only a structure in the base portion 13 is different. FIG. 11 is a sectional view corresponding to FIG. 3; FIG. 12 is a sectional view taken along line 12—12 in FIG. 11; and FIG. 13 is a sectional view showing a state wherein a detecting arm 114 shown in FIG. 12 is rotated by about 90 degrees in the counterclockwise direction. FIG. 14*a* is a sectional view taken along line 14*a*—14*a* in FIG. 11, and FIGS. 14*b*, 14*c*, 14*d*, 14*e* are sectional views of respective essential parts in FIG. 14*a*.

In FIGS. 11 and 12, reference numeral 111 denotes a main shaft portion, such as a lathe; 113 is a base portion fixed to the main shaft portion 111; and 118*a* is a boss of a rotating plate 118 passing through a hole 113*a* of the base portion 113, so that it projects upward from a surface of the base portion 113 and a forward end portion of the boss 118*a* is fixed to one end portion of the detecting arm 114 through a bolt or the like. Incidentally, a small hole 118*b* provided to the boss 118*a* is a hole for a lead wire for a sensor extending from the base portion 113 to the tool edge sensor (15 in FIGS. 1 and 2) provided at a forward edge of the detecting arm 114.

In the rotating plate 118, roller bearings 119*a*, 119*b*, 119*c* are rotatably mounted on rotating shafts 120*a*, 120*b*, 120*c* disposed at approximately trisected positions with respect to the center of the rotating plate 118, and are rotated while contacting an outer circumference of the shaft portion 113*b* of the base portion 113 with their outer circumferences. Thus, the detecting arm 114 can be rotated, with respect to the base portion 113, by virtue of the roller bearings 119*a*, 119*b*, 119*c*; a lower edge surface, in FIG. 11, of the shaft portion 113*b*; an upper surface, in FIG. 11, of the rotating plate 118; and a thrust bearing 122 disposed in a cover 121 integrated with the base portion 113. A space is provided between an outer circumference of the boss 118*a* and the hole 113*a* so as not to contact each other.

In FIGS. 14*a*, 14*b*, 14*c*, 14*d* and 14*e*, small steel balls 131*a*, 131*b*, 131*c*, as shown in FIG. 14*c*, are fixed to an outer circumferential radial edge surface 130 of the rotating plate 118. Also, a projecting portion 132 is provided on the outer circumference of the rotating plate 118 separated by about 120 degrees from the radial edge surface 130 with respect to the center of the rotating plate 118, and a steel ball 134 is fixed to a radial edge surface 133 of the projecting portion 132. Further, a steel ball 135 is fixed to the rotating plate 118, on the back side of the sheet of FIG. 14*a*, separated by about 120 degrees from the radial edge surface 130 and the radial edge surface 133, respectively, with respect to the center of the rotating plate 118.

In case the detecting arm 114 is located at the position as shown in FIGS. 1 and 2, i.e. detecting position, the detecting arm 114 applies an eccentric load, i.e. turning moment, to the base portion 113. More specifically, in the state as shown in FIG. 14*a*, the detecting arm 114 provides the eccentric load, so that a large steel ball 137 fixed to a steel ball holder 136 screwed into a screw provided to the base portion 113 contacts the three small steel balls 131*a*, 131*b*, 131*c* at three points in total as shown in FIG. 14*c*; and the steel ball 134 contacts, at two points as shown in FIG. 14*e*, a V block 138 having a V groove facing the center of the base portion 113 and fixed to the base portion 113. Also, the steel ball 135 contacts, at one point as shown in FIG. 14*b*, a plane pillar 139 disposed in a wall of the base portion 113. Incidentally, after the tool edge sensor 15 of the detecting arm 114 is adjusted to the detecting position by finely adjusting a screw for the steel ball holder 136, a double nut 136*a* is tightened to lock.

In case the detecting arm 114 is located at the position as shown in FIGS. 1, 2, 11, 12 and 14*a*, i.e. the detecting position, the outer circumferential positions of the roller bearings 119*a*, 119*b*, 119*c* coincide with the escape portions 128*a*, 128*b*, 128*c* of the shaft portion 113*b*, and the detecting arm 114 has nothing to do with the roller bearings 119*a*, 119*b*, 119*c*. Also, since a shaft bearing portion including a lower surface of the shaft portion 113*b* in FIG. 11, an upper surface of the rotating plate 118 and the thrust bearing 122 disposed in the cover 121 is set loosely, i.e. with a play, the detecting arm 114 is supported only by the six point contacts with the steel balls. In other words, the detecting arm 114 is three-dimensionally restricted at the detecting position, i.e. in the X, Y and Z directions with respect to the base portion 113.

Especially, a contact method wherein in the six-point contacts, the small three steel balls provided to the rotating plate 118 contact at three points to the large steel ball 137 integrated with the base portion 113 is extremely effective in improving the accurate positioning.

In FIG. 12, in case the detecting arm 114 is rotated in the G direction, the roller bearings 119*a*, 119*b*, 119*c* are moved out of the escape portions 128*a*, 128*b*, 128*c* to thereby rotate on the shaft portion 113*b*. When the detecting arm 114 is rotated by, for example, 90 degrees with respect to the base portion 113, as shown in FIG. 13, it is stopped at a position where the radial edge surface 140 abuts against a rear surface of the V block 138. In other words, the tool edge sensor 15 is retreated from a working area of an object to be worked which is attached to the main shaft 112 of the lathe, and housed in a position which does not obstruct the work of the lathe or the like.

As described hereinabove, the rotating device and the positioning device for the detecting arm 114 are separated, and the detecting arm 114 is rotated by the rotating device. Also, the detecting arm 114 is positioned only by the positioning device at the detecting position, wherein the detecting arm is released from the restriction of the above rotating device.

Figure 15A:
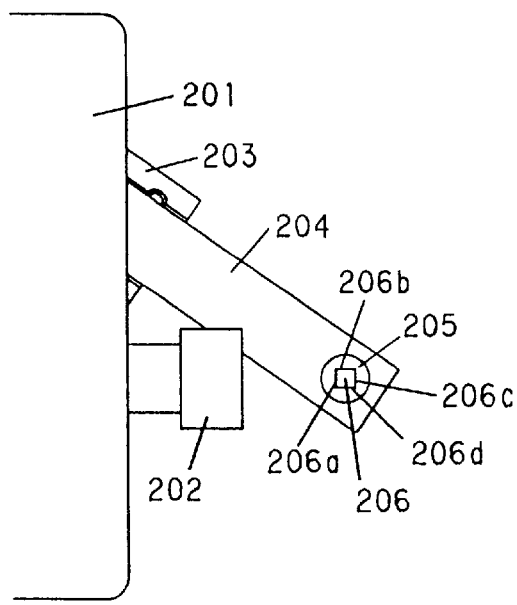
FIG. 15a is a plan view for showing a structure of a fourth embodiment of the present invention.

FIGS. 15*a* to 22 show a forth embodiment of a moving apparatus of a detecting arm for a tool edge sensor of the invention, wherein FIG. 15*a* is a plan view of the invention; FIG. 15*b* is a side view; and FIG. 15*c* shows a state where the detecting arm as shown in FIG. 15*a* is housed. In the drawings, reference numeral 201 denotes a main shaft portion, such as a lathe; 202 is a main shaft; 203 is a base guide; 204 is the detecting arm; 205 is a tool edge sensor provided at a forward end of the detecting arm 204; and 206 is a contact of the tool edge sensor 205 wherein respective contacting surfaces 206*a*, 206*b*, 206*c*, 206*d* are positioned to be vertical with respect to the main shaft 202.

Figure 15B:
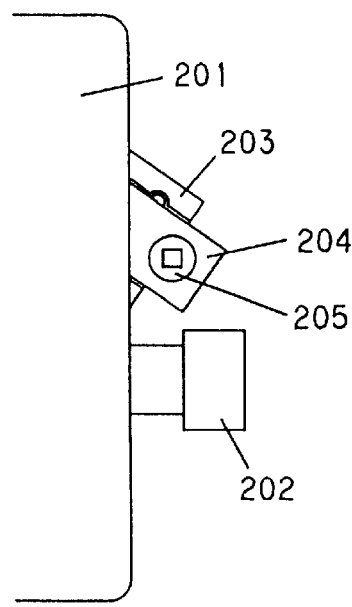
Figure 15C:
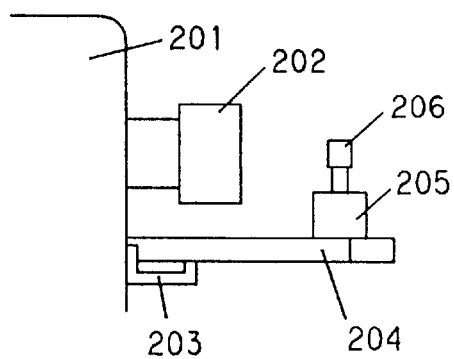

FIGS. 15*a*, 15*b* show a state where the detecting arm 204 slides from the base guide 203 to project, so that the contact 206 of the tool edge sensor 205 is positioned on an extended center line of the main shaft 202 and a bite of the tool edge sensor or the like can be detected. FIG. 15*c* shows a state where the detecting arm 204 is housed in the base guide 203 and the tool edge sensor 205 is retreated not to obstruct the work.

Figure 16A:
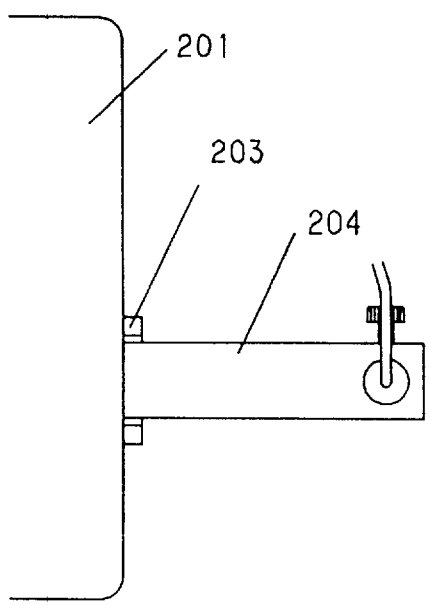
Figure 16B:
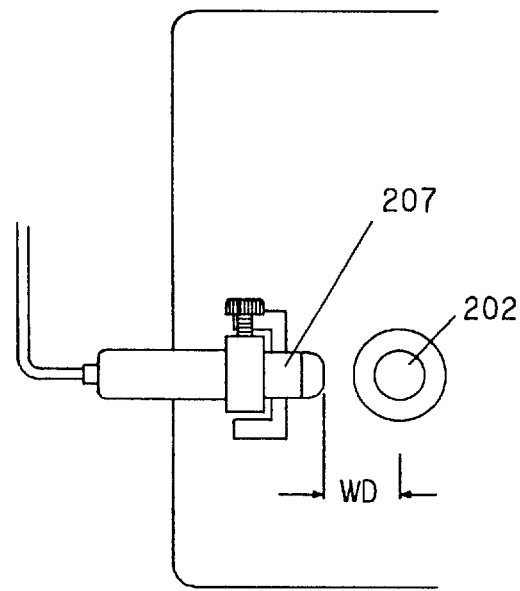

FIG. 16*a* is a plan view for showing a structure of the invention wherein a touch sensor as the tool edge sensor is not used, and FIG. 16b is a front view thereof. In the drawings, the base guide 203 and the detecting arm 204 are provided on the main shaft 202, and a video scope 207 as the tool edge sensor is disposed at a forward end of the detecting arm 204.

The video scope 207 for the tool edge sensor has a working distance (WD) for an optical system. However, although the base guide 203 and the detecting arm 204 are disposed on a line of the main shaft 202, in case the detecting arm 204 is housed in the base guide, the video scope 207 can be retreated on the line of the main shaft 202 not to obstruct the work. The video scope 207 for the tool edge sensor has, for example, a charge coupled device (CCD) to detect an image of the tool edge position and processes the image.

Figure 18:
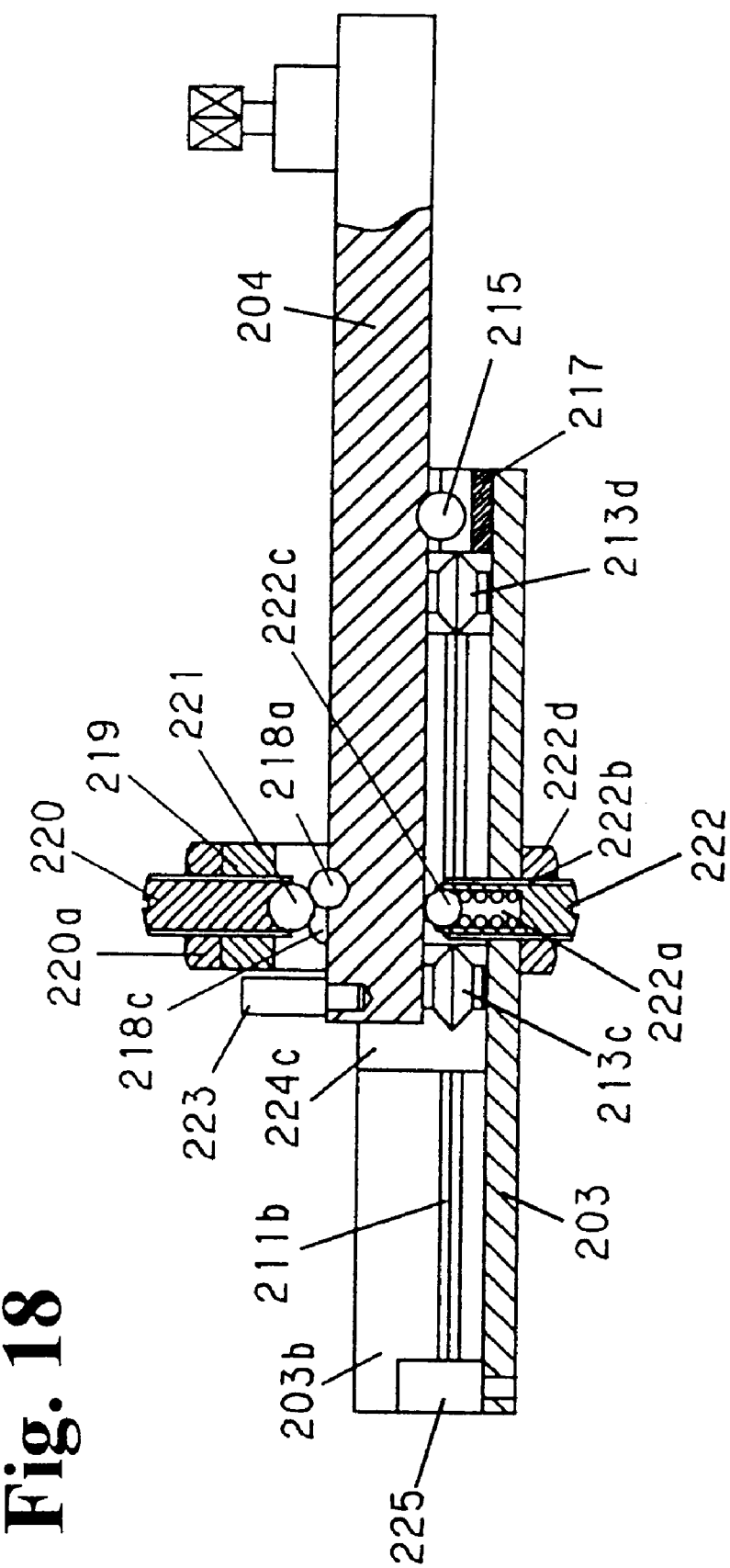

FIGS. 17a to 21b show a structure of the base guide 203 and the detecting arm 204, wherein FIG. 17a is a plan view and FIG. 17b is a plan view of a left end portion of the detecting arm 204; FIG. 18 is a sectional view taken along line 18—18 in FIG. 17a; FIG. 19a is a sectional view taken along line 19a—19a in FIG. 17a; and FIG. 19b is a sectional view taken along line 19b—19b in FIG. 19a; FIG. 20a is a sectional view taken along line 20a—20a in FIG. 19(a); FIG. 20b is a sectional view taken along line 20b—20b in FIG. 20a; FIG. 21a is a sectional view similar to FIG. 20a where the detecting arm 204 is housed in the base guide 203; and, FIG. 21b is a sectional view taken along line 21b—21b in FIG. 21a.

Figure 20B:
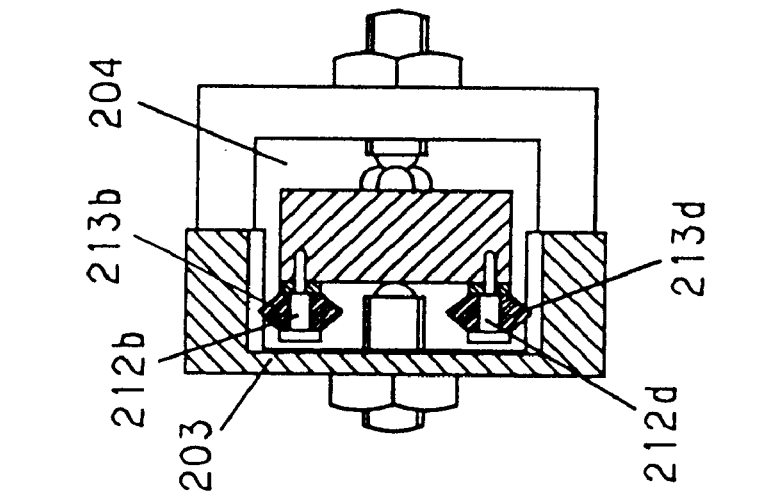
Figure 20A:
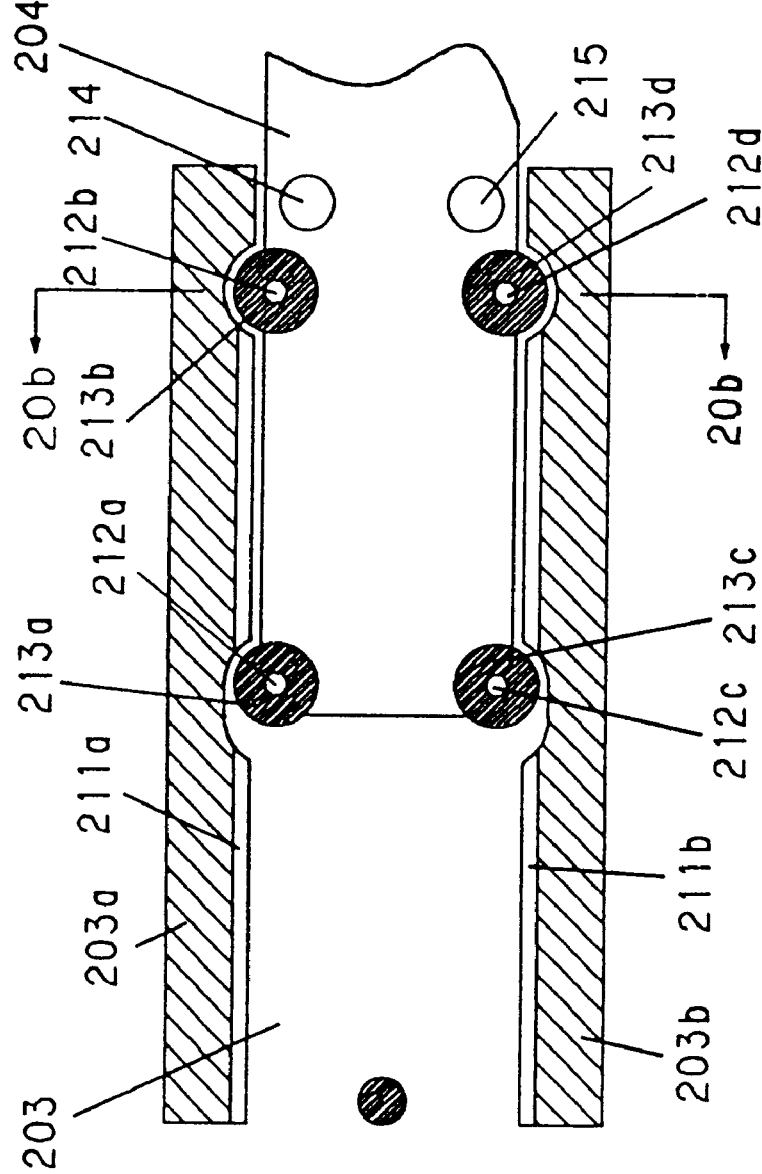

The base guide 203 has a channel shape, and V-shape grooves 211a and 211b are provided in a longitudinal direction inside both side walls 203a, 203b of the base guide 203, as shown in FIGS. 20a and 21a. V-shape outer diameter portions of V-rollers 213a, 213b, 213c, 213d are rotatably fitted to rotating shafts 212a, 212b, 212c, 212d situated at four positions on a lower surface of the detecting arm 204, and are fitted in the V-shape grooves 211a, 211b, so that the detecting arm 204 can slide on the V-shape grooves 211a, 211b as rails.

Steel balls 214, 215 are fixed on the lower surface of the detecting arm 204 at both sides in the width direction and at a center portion in the longitudinal direction. In the state as shown in FIGS. 17a to 20b, the steel ball 214 contacts, at two points, a V-groove of a V-block 216 fixed to a right end of the base guide 203, and the steel ball 215 contacts, at one point, a plane surface block 217 fixed to a left end of the base guide 203.

Figure 19B:
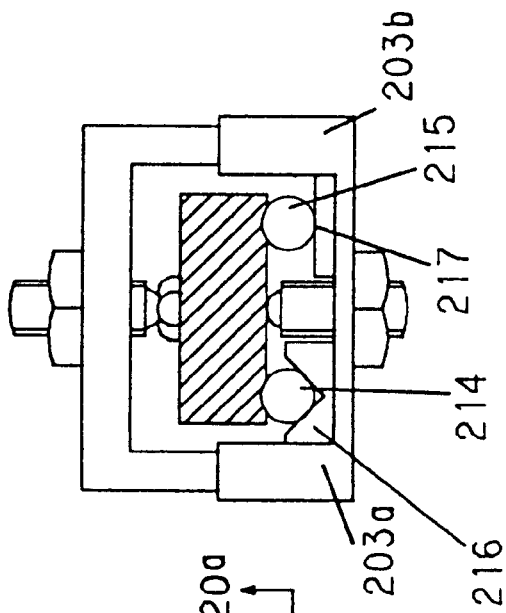
Figure 19A:
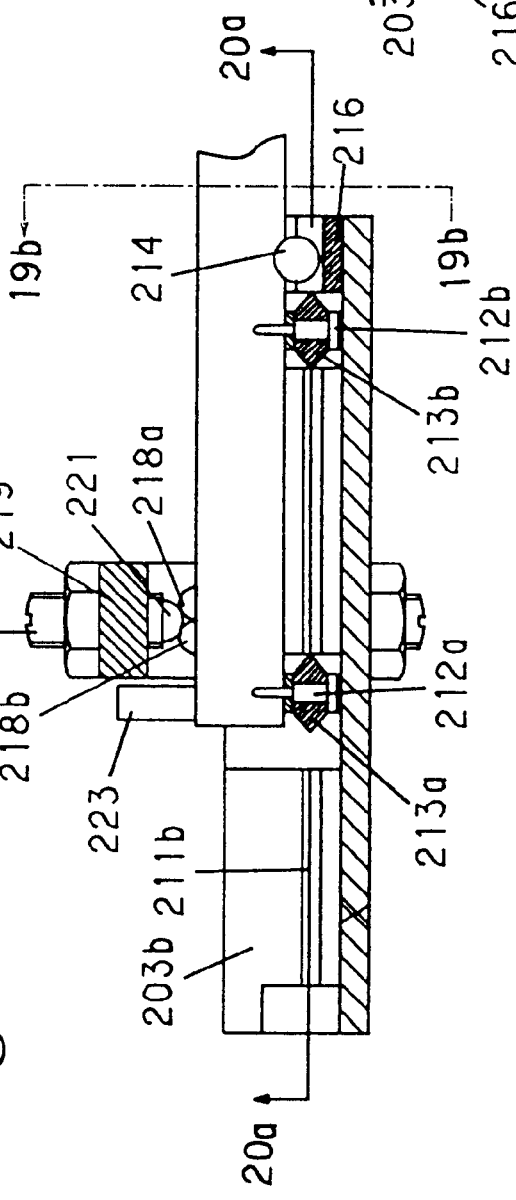

On the other hand, as shown in FIG. 17b, small steel balls 218a, 218b, 218c are fixed on an upper surface of the detecting arm 204 at a left side center portion so that centers of the small steel balls form an equilateral triangle. As shown in FIG. 19a, the three small steel balls 218a, 218b, 218c contact, at each one point, a large steel ball 221 fixed to a forward end of a steel ball holder 220 screwed into a channel 219 fixed to the base guide 203, so that the large steel ball 221 contacts at three points in total.

The steel ball holder 220 can be finely moved vertically with respect to the channel 219 by rotating the same. Therefore, a position of a contact 206 of the tool edge sensor 205 can be adjusted. After adjustment, a hexagon nut 220a is tightened to lock the steel ball holder 220 with a double nut action.

Further, in FIG. 18, a male screw 222 is threaded into the base guide along a downwardly extended line of a center axis of the steel ball holder 220, and is provided with a hole 222a in which a steel ball 222c pushed by a compression coil spring 222b is fitted. The hole 222a has a narrow diameter portion at a forward end thereof, so that the steel ball 222c does not spring out from the forward end. Incidentally, reference numeral 222d is a double nut for locking the male screw 222.

When the detecting arm 204 is manually projected or pulled from the base guide 203, a stopper 223 abuts against the channel 219 and the large steel ball 221 slightly mounts on one ball 218a of the three small steel balls to thereby stop. When the manual projecting or pulling force is removed therefrom, the steel ball 222c compressed by the compression coil spring 222b pushes so that the three small steel balls 218a, 218b, 218c contact the large steel ball 221 respectively, i.e. three points in total of the large steel ball.

In the state as shown in FIGS. 17a to 20b, i.e. in case the detecting arm is located at the detecting position, the outer diameter portions of the V rollers 213a, 213b, 213c, 213d are positioned at the escape portions 224a, 224b, 224c, 224d without having the V-shape grooves 221a, 211b. Thus, the V rollers 213a, 213b, 213c, 213d have nothing to do with the V-shape grooves 211a, 211b, and the steel ball 214 fixed to the detecting arm 204 contacts the V-groove of the V block 216 at two points. Similarly, the steel ball 215 contacts the surface of the plane block 217 at one point, and the large steel ball 221 contacts the small three steel balls 218a, 218b, 218c at three points. Namely, contacts, are made at six points in total.

In other words, the detecting arm 204 is three-dimensionally restricted with six-point contacts with respect to the base guide 203. More specifically, as shown in FIGS. 15a, 15b, 17a and 18, in case the detecting arm 204 slides out of the base guide 203 so as to project, the detecting arm 204 can be restricted at the detecting position.

In order to retreat the tool edge sensor 205 by housing the detecting arm 204 in the base guide 203 so that the tool edge sensor 205 does not obstruct the work, the detecting arm 204 is retreated manually so that the V rollers 213a, 213b, 213c, 213d positioned in the escape portions 224a, 224b and 224c, 224d slide on the V-grooves 211a, 211b as rails and a left end of the detecting arm abuts against a stopper 225 as shown in FIG. 21a to thereby stop.

Figure 22:
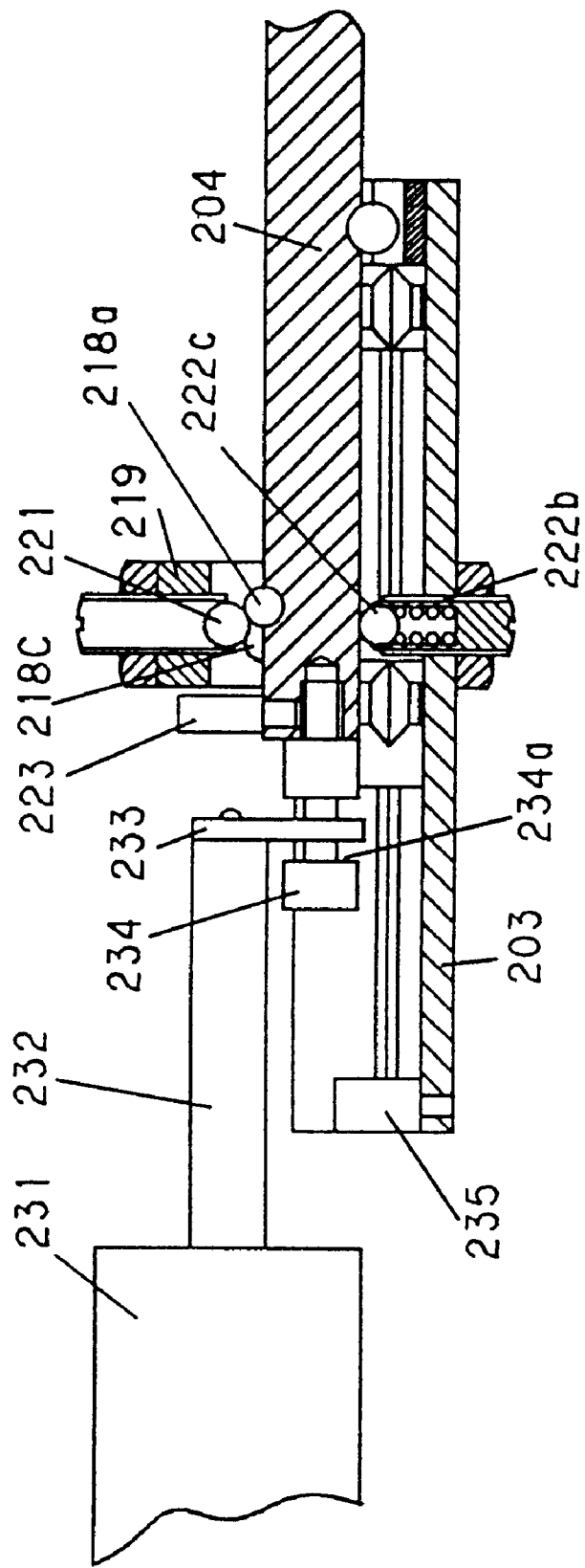
FIG. 22 is a side view of another embodiment corresponding to the sectional view of FIG. 18.

FIG. 22 shows an example wherein the detecting arm 204 can be automatically projected from the base guide 203 to be restricted at the detecting position, and also, the detecting arm 204 is automatically housed in the base guide 203. A forked portion of a forked lever 233 attached to a forward end of a plunger 232 of a compression air cylinder 231 is inserted into a smaller diameter portion 234a of a shaft 234 provided at a rear end of the detecting arm 204.

After the plunger 232 is extended to press the shaft 231 and the stopper 223 abuts against the channel 219, the plunger 232 is slightly returned automatically as shown in FIG. 22. Since the forked portion of the forked lever 233 and the small diameter portion 234a of the shaft 234 have a clearance in the axial direction and the steel ball 222c compressed by the coil spring 222b presses so that the three small steel balls 218a, 218b, 218c positively contact the large steel ball 221 at three points, the detecting arm 204 is restricted at the detecting position slightly returned from the stop position. In other words, the detecting arm 204 is restricted three-dimensionally, i.e. in the X, Y and Z directions with respect to the base guide 203, at the detecting position by the load thereof.

Especially, a contact method wherein the three small steel balls provided to the detecting arm 204 contact, at the three points, the large steel ball 221 integrated with the base guide 203 is extremely effective in improving the accuracy.

When the plunger 232 is withdrawn, the forked portion of the forked lever 233 pulls the shaft 234, so that the detecting arm 204 is retreated into the base guide 203 and the stopper 235 abuts against the left edge of the detecting arm 204 to thereby stop. Thus, the detecting arm 204 is automatically retreated into the base guide 203 from a working area of an object to be worked which is to be attached to the main shaft 202 of the lathe, so that the work of the lathe or the like is not obstructed.

As described hereinabove, the moving device and the positioning device for the detecting arm 204 are separated, and the detecting arm is moved by the moving device. At the detecting position of the detecting arm 204, the detecting arm 204 is released from the restriction of the moving device, and is positioned only by the positioning device.

As the tool edge sensor, the touch sensor has been mainly shown in the embodiments. However, the video scope as shown in FIG. 16 can be applied to the other embodiments and, conversely, the touch sensor can also be applied to the embodiment as shown in FIG. 16 as the tool edge sensor. The present invention can also be applied to positioning of a tool setter in a machining center.

In the present invention, a moving device and a positioning device of a detecting arm are separated; the detecting arm is moved by the moving device; and at a detecting position of the detecting arm, the detecting arm is released from the restriction of the moving device and is positioned only by the positioning device. Therefor, a position error due to the moving device is not added at the time of setting the detecting position.

Further, since the positioning of the detecting arm at the detecting position is carried out by the six point contacts, positioning accuracy, especially iterative positioning accuracy becomes extremely high.

Also, a contact method wherein a steel ball contacts three steel balls at three points out of six detecting points included in the positioning device of the detecting arm is extremely effective in improving accuracy.

While the invention has been explained with reference to the specific embodiments of the invention, the explanation is illustrative, and the invention is limited only by the appended claims.

What is claimed is:

1. A moving apparatus of an arm for a tool edge sensor comprising:

a base;

a detecting arm having a detecting sensor at a forward end thereof, said detecting arm being attached to the base to be movable between a housing position which does not obstruct a processing work and a detecting position projecting from the housing position;

a moving device attached between the base and the detecting arm for moving the detecting arm; and a positioning device formed of at least six-point contacts for restricting the detecting arm at the detecting position and situated between the base and the detecting arm so that the detecting arm is moved by the moving device between the housing position and a position right before the detecting position, and is positioned at the detecting position by only the positioning device, released from restriction of the moving device.

2. A moving apparatus according to claim 1, wherein said moving device is formed of a rotating device provided at the base and the detecting arm.

3. A moving apparatus according to claim 2, wherein said detecting arm includes a rotating plate at a base side thereof and provides an eccentric load to the rotating plate when the detecting arm is located in the detecting position, said positioning device including the six-point contacts being arranged on both sides of the rotating plate to receive a contact pressure for the six-point contacts from the detecting arm.

4. A moving apparatus according claim 2, wherein said detecting arm includes a rotating plate at a base side thereof, said positioning device including the six-point contacts being arranged at one side of the rotating plate and receiving a contact pressure through a pressing force between the rotating plate and the base.

5. A moving apparatus according to claim 2, wherein said positioning device includes one steel ball contacting three steel balls to provide three-point contacts therebetween.

6. A moving apparatus according to claim 1, wherein said moving device includes a base guide formed in the base so that the detecting arm is guided by the base guide and slides linearly.

7. A moving apparatus according to claim 6, wherein said positioning device including the six-point contacts is provided between the base guide and the detecting arm, and a contact pressure for the contacts is a load of the detecting arm at a base side of the detecting arm.

8. A moving apparatus according to claim 6, wherein said moving device further includes rollers attached to the detecting arm, said base guide having recessed portions so that when the detecting arm is located in the detecting position, the rollers are located in the recessed portions.

9. A moving apparatus according to claim 1, wherein said positioning device includes first steel ball contacting three points, a second steel ball contacting two points, and a third steel ball contacting one point.

10. A moving apparatus according to claim 1, wherein said moving device includes a plurality of rollers rotationally attached to the base, and said detecting arm includes a shaft engaging the rollers, said shaft having recessed portions so that when the detecting arm is located in the detecting position, the rollers are located in the recessed portions.

* * * * *